US012104048B2

(12) United States Patent
Thitsartarn et al.

(10) Patent No.: US 12,104,048 B2
(45) Date of Patent: Oct. 1, 2024

(54) REINFORCED POLYOLEFIN COMPOSITE

(71) Applicants: Agency for Science, Technology and Research, Singapore (SG); SCG Chemicals Co. Ltd, Bangkok (TH)

(72) Inventors: Warintorn Thitsartarn, Singapore (SG); Chaobin He, Singapore (SG); Chee Chuan Jayven Yeo, Singapore (SG); Nopphawan Phonthammachai, Bangkok (TH); Supakitt Treethammakul, Bangkok (TH); Tanapon Sukachonmakul, Bangkok (TH)

(73) Assignees: Agency for Science, Technology and Research, Singapore (SG); SCG Chemicals Co. Ltd (TH)

( * ) Notice: Subject to any disclaimer, the term of this patent is extended or adjusted under 35 U.S.C. 154(b) by 858 days.

(21) Appl. No.: 17/043,179

(22) PCT Filed: Mar. 29, 2019

(86) PCT No.: PCT/SG2019/050179
§ 371 (c)(1),
(2) Date: Sep. 29, 2020

(87) PCT Pub. No.: WO2019/190407
PCT Pub. Date: Oct. 3, 2019

(65) Prior Publication Data
US 2021/0139684 A1    May 13, 2021

(30) Foreign Application Priority Data
Mar. 29, 2018    (SG) .......................... 10201802637R

(51) Int. Cl.
*C08L 23/12*    (2006.01)
*C08J 3/22*    (2006.01)
(Continued)

(52) U.S. Cl.
CPC ............... *C08L 23/12* (2013.01); *C08J 3/226* (2013.01); *C08J 2323/12* (2013.01);
(Continued)

(58) Field of Classification Search
CPC ... C08L 23/12; C08J 2323/12; C08J 2423/12; C08K 3/346; C08K 9/04; C08K 9/06
See application file for complete search history.

(56) References Cited

U.S. PATENT DOCUMENTS 4,006,037 A    2/1977    Tirpak et al.
4,417,019 A    11/1983    Yamamoto et al.
(Continued)

FOREIGN PATENT DOCUMENTS

CA    1180836    1/1985
CN    103897287 A    7/2014
(Continued)

OTHER PUBLICATIONS

Machine translation of JP-2002155605-A from Espacenet (Year: 2002).*
(Continued)

*Primary Examiner* — Kregg T Brooks
*Assistant Examiner* — David R. Foss
(74) *Attorney, Agent, or Firm* — Shackelford, McKinley & Norton, LLP

(57) ABSTRACT

A reinforced polyolefin composite is provided. The reinforced polyolefin composite comprises a polyolefin such as polyethylene or polypropylene, a rigid fibre micro filler such as glass fiber, carbon or cellulosic fibers, and at least one nano filler such as clay. The reinforced polyolefin composite may also comprise a modified polyolefin, which has a polar functional group such as maleate monoester, an acid anhydride or an acrylate grafted thereon. The clay nano filler may also be modified with an organosilane. The reinforced
(Continued)

polyolefin composite may also comprise a stabilizer or other additives. A method of producing the reinforced polyolefin composite is also provided, comprising mixing a polyolefin, a rigid micro filler and at least one nano filler to form a mixture, melting the mixture and kneading the melted mixture. The obtained reinforced polyolefin composite is used in transportation, infrastructure, consumer goods and construction.

16 Claims, 3 Drawing Sheets

(51) Int. Cl.
*C08K 3/34* (2006.01)
*C08K 9/04* (2006.01)
*C08K 9/06* (2006.01)

(52) U.S. Cl.
CPC ........ *C08J 2423/12* (2013.01); *C08J 2451/06* (2013.01); *C08K 3/346* (2013.01); *C08K 9/04* (2013.01); *C08K 9/06* (2013.01); *C08L 2310/00* (2013.01)

(56) References Cited

U.S. PATENT DOCUMENTS

| | | | |
|---|---|---|---|
| 5,030,682 | A | 7/1991 | Nomura et al. |
| 5,206,284 | A | 4/1993 | Fukui et al. |
| 5,637,629 | A | 6/1997 | Moro et al. |
| 11,248,106 | B2 * | 2/2022 | Thitsartarn ............ C01B 33/40 |
| 2004/0072936 | A1 | 4/2004 | Kim et al. |
| 2006/0241221 | A1 | 10/2006 | Yamamoto et al. |
| 2008/0293861 | A1 | 11/2008 | Wang |
| 2010/0196611 | A1 | 8/2010 | Phonthammachai et al. |
| 2015/0307258 | A1 * | 10/2015 | Har-Shai ............ B65D 83/0061 222/215 |

FOREIGN PATENT DOCUMENTS

| | | |
|---|---|---|
| CN | 104277327 A | 1/2015 |
| CN | 105860220 A | 8/2016 |
| CN | 106009287 A | 10/2016 |
| CN | 107778871 A | 3/2018 |
| EP | 0472344 A2 | 2/1992 |
| EP | 3144347 A1 | 3/2017 |
| EP | 3144348 A1 | 3/2017 |
| EP | 3360918 A1 | 8/2018 |
| JP | 314854 A | 1/1991 |
| JP | 496957 A | 3/1992 |
| JP | 2002155605 A * | 5/2002 |
| JP | 2004182826 A | 7/2004 |
| JP | 2020522603 A | 7/2020 |
| KR | 10-2010-0105028 | 9/2010 |
| WO | 9947598 | 9/1999 |
| WO | 0061676 A1 | 10/2000 |
| WO | 0078540 A1 | 12/2000 |
| WO | WO-02081586 A1 * | 10/2002 ............ C09J 11/04 |
| WO | 2004009697 A1 | 1/2004 |
| WO | 2005075569 A1 | 8/2005 |
| WO | 2006018495 A1 | 2/2006 |
| WO | WO-2009079495 A1 * | 6/2009 .......... C08L 23/0869 |
| WO | 2014088515 A1 | 6/2014 |
| WO | 2015000738 A1 | 1/2015 |
| WO | 2016111647 A1 | 7/2016 |
| WO | 2018182522 A1 | 10/2018 |
| WO | 2018226680 A1 | 12/2018 |

OTHER PUBLICATIONS

International Search Report for International Application No. PCT/SG2019/050179 dated Aug. 7, 2019, pp. 1-6.

Written Opinion of the International Searching Authority for International Application No. PCT/SG2019/050179 dated Aug. 7, 2019, pp. 1-7.

Chen et al., "Poly(propylene)/Clay Nanocomposites Prepared by Reactive Compounding with an Epoxy Based Masterbatch," Macromolecular Materials and Engineering, vol. 290, 2005, pp. 1029-1036.

Kumar et al., "Polypropylene Clay Nanocomposites," Reviews in Chemical Engineering, vol. 29, No. 6, 2013, pp. 439-448.

Office Action for Japanese Patent Application No. 2020-552303 dated Feb. 14, 2023, pp. 1-7.

Office Action for Korean Patent Application No. 10-2020-7030346 dated Nov. 28, 2023, pp. 1-14.

* cited by examiner

| PP Compound Series | Filler Content (wt%) | | Flex E (GPa, Span 25.4, 1mm/min) | Max Flex Strength (MPa) | Tensile E (GPa, 1mm/min) | Max Tensile Strength (MPa) | Impact Strength (kJ/m²) |
|---|---|---|---|---|---|---|---|
| | Glass fiber | Nanofiller | | | | | |
| Neat PP | 0 | 0 | 2.00 ± 0.04 | 44.5 ± 3.76 | 1.32 ± 0.08 | 28.0 ± 0.35 | 6.86 ± 0.41 |
| Comparative Sample 1 | 0 | 0 | 1.98 ± 0.09 | 46.3 ± 1.24 | 1.53 ± 0.03 | 28.4 ± 0.18 | 7.00 ± 0.26 |
| Comparative Sample 2 | 10 | 0 | 2.88 ± 0.03 | 62.0 ± 0.2 | 2.22 ± 0.11 | 32.9 ± 1.0 | 5.85 ± 0.50 |
| | 15 | 0 | 3.39 ± 0.17 | 67.5 ± 1.2 | 2.76 ± 0.03 | 37.8 ± 0.21 | 5.58 ± 0.40 |
| | 20 | 0 | 3.85 ± 0.04 | 73.8 ± 0.8 | 2.93 ± 0.04 | 39.0 ± 0.6 | 5.42 ± 0.23 |
| | 30 | 0 | 5.09 ± 0.07 | 88.3 ± 0.4 | 4.00 ± 0.06 | 47.4 ± 0.9 | 4.96 ± 0.37 |
| Example 1 | 10 | 5 | 2.89 ± 0.05 | 54.6 ± 1.5 | 2.41 ± 0.02 | 32.5 ± 0.3 | 4.60 ± 0.47 |
| | 10 | 10 | 2.82 ± 0.09 | 54.0 ± 1.2 | 2.56 ± 0.05 | 33.9 ± 0.7 | 4.61 ± 0.39 |
| Example 2 | 10 | 5 | 3.14 ± 0.06 | 48.7 ± 0.6 | 2.80 ± 0.05 | 29.0 ± 0.6 | 3.32 ± 0.18 |
| | 10 | 10 | 3.59 ± 0.04 | 48.1 ± 0.4 | 3.17 ± 0.07 | 28.5 ± 0.3 | 3.48 ± 0.12 |
| Example 3 | 10 | 5 | 3.50 ± 0.10 | 67.1 ± 0.6 | 2.73 ± 0.02 | 35.8 ± 0.4 | 4.35 ± 0.26 |
| | 10 | 10 | 3.83 ± 0.07 | 69.1 ± 1.2 | 3.29 ± 0.08 | 36.6 ± 0.4 | 4.04 ± 0.41 |

FIG. 1 ic micro fillers or nano fillers are used in the polyolefin. For example, use of rigid micro fillers alone in the polyolefin often involves using a high amount in order to obtain the desired mechanical properties, which comes at the detriment of processability and weight (as mentioned above). Use of nano fillers alone, on the other hand, is insufficient to reinforce a polyolefin in view of the fact that nano fillers have difficulty in dispersing homogeneously in polyolefins. Therefore, the strategy of the present disclosure of using a rigid micro filler together with at least one nano filler serves to overcome the above problems, while also resulting in a reinforced polyolefin composite having a good balance of overall density, processability, toughness and stiffness.

REINFORCED POLYOLEFIN COMPOSITE

CROSS-REFERENCE TO RELATED APPLICATION

This application claims the benefit of priority of Singapore patent application No. 10201802637R filed on 29 Mar. 2018, the content of which is incorporated herein by reference in its entirety for all purposes.

TECHNICAL FIELD

Various embodiments relate to a reinforced polyolefin composite and a method of preparing the reinforced polyolefin composite, as well as application of the reinforced polyolefin composite.

BACKGROUND

Polyolefins are used extensively as molding materials due to their good processability, even at low temperatures, their high flexibility, good chemical resistance, and because they are light weight and are cost effective, just to name a few of their advantages. On the other hand, some of their disadvantages are low strength, low toughness and low heat-distortion resistance. In use of the polyolefins for some applications such as for mechanical or structural parts, higher stiffness and heat resistance are required. To overcome the above mentioned disadvantages, one solution is to incorporate large amount of inorganic fillers such as talc, mica, and glass fibers. However, the large amounts being used may lead to problems such as poor filler dispersion or filler agglomeration, increased weight, large warpage, and poor processability (especially for fillers being made of glass or carbon) of the resultant polyolefin composite. Another solution to the above mentioned problems is reactive compounding. However, this is often uncontrollable and associated with difficulties in recycling of the resulting polymer.

Hence, there remains a need for an improved polyolefin composite and a method of preparing the polyolefin composite that address or at least alleviate one or more of the above-mentioned problems.

SUMMARY

In a first aspect, there is provided a reinforced polyolefin composite comprising a polyolefin and fillers dispersed in the polyolefin, wherein the fillers comprise a rigid micro filler, and at least one nano filler.

In a second aspect, there is provided a method of providing a reinforced polyolefin composite, comprising a polyolefin and fillers dispersed in the polyolefin, wherein the fillers comprise a rigid micro filler, and at least one nano filler, the method comprising (i) mixing a polyolefin, a rigid micro filler and at least one nano filler to form a mixture; (ii) melting the mixture to form a melted mixture; and (iii) kneading the melted mixture.

In a third aspect, there is provided a reinforced polyolefin composite provided by the method as defined in the second aspect.

In a fourth aspect, there is provided use of a reinforced polyolefin composite as defined in the first aspect or in the third aspect in transportation, infrastructure, consumer goods, and/or construction.

BRIEF DESCRIPTION OF THE DRAWINGS

The invention will be better understood with reference to the detailed description when considered in conjunction with the non-limiting examples and the accompanying drawings, in which:

FIG. 1 is a table showing reinforced polyolefin composites in accordance with the present disclosure and comparative examples, and a comparison of their mechanical properties.

DETAILED DESCRIPTION

Figure 2:
FIG. 2 is a Transmission Electron Microscopy (TEM) image showing the dispersion of fillers in the reinforced polyolefin composite as obtained for Example 1. The scale bar represents a length of 1 μm.

Various embodiments disclosed herein are directed to a reinforced polyolefin composite. In its broadest sense, the composite of the present disclosure comprises (a) a polyolefin, (b) a rigid micro filler, and (c) at least one nano filler.

Accordingly, in a first aspect, there is provided a reinforced polyolefin composite comprising a polyolefin and fillers dispersed in the polyolefin, wherein the fillers comprise a rigid micro filler, and at least one nano filler.

Advantageously, the combination of a rigid micro filler, and at least one nano filler serves to reinforce the polyolefin to result in a reinforced polyolefin composite having an overall lower filler content (which may be at or below 15 wt %), while maintaining a high dispersion of the fillers within the reinforced polyolefin composite. Additionally, due to the addition of the at least one nano filler, it is possible to reduce the amount of rigid micro filler within the matrix that is formed by the polyolefin. This is important in order to reduce the overall density of the reinforced polyolefin composite, hence making it lighter than, for example, engineering plastics. Accordingly, the reinforced polyolefin composite in accordance with various embodiments has demonstrated densities ranging from about 0.9 g/cm$^3$ to 0.97 g/cm$^3$, as compared to densities of about 1.2 g/cm$^3$ to 1.4 g/cm$^3$ obtained for a polypropylene that was reinforced with the same weight amount of filler, but the filler consisting of glass fibers only. This decrease in the overall density may be due to a lower density of the at least one nano filler as compared with the density of the glass fiber as an example of a rigid micro filler. Moreover, despite use of an additional type of filler in the form of at least one nano filler, processability may be maintained. Depending on the nano filler used, the physical properties may at least be maintained, and in some embodiments, be improved by using a combination of a rigid micro filler and at least one nano filler as the fillers.

For example, by adding at least one nano filler to the polyolefin matrix, it is possible to reduce the amount of glass filler (one example of a rigid micro filler), which reduces the density of the reinforced polyolefin composite. A reduced amount of glass filler (for example), was also found by the inventors to be beneficial in processability, as a high amount of glass filler was found to harm the processing equipment.

Use of fillers comprising a rigid micro filler and at least one nano filler to reinforce polyolefin therefore possesses advantages over existing technologies whereby only rigid micro fillers are used. Those technologies sacrifice light weight and processability of the polyolefin matrix for obtaining high reinforcement. It was surprisingly found by the inventors that combined use of a rigid micro filler and at least one nano filler as fillers to reinforce polyolefin provides a synergistic effect, in that a high reinforcement of the polyolefin was observed, while being light weight and processable. This synergistic effect may be based on the different types of the fillers in the form of a rigid micro filler and at least one nano filler, which serve to perform different mechanisms of mechanical enhancement due to the difference in size of the fillers (among others), and the good adhesion between the fillers and the polyolefin matrix. For example, the at least one nano filler may have the effect of bridging differing polarities between the substantially polar rigid micro filler and the substantially non-polar polyolefin matrix.

According to various embodiments disclosed herein, a polyolefin is provided, which forms a matrix for dispersing fillers comprising a rigid micro filler and at least one nano filler. In various embodiments, the polyolefin does not chemically react with the fillers, hence does not form a covalent bond with the fillers. Typically, a polyolefin is a non-polar, or hydrophobic material. The polyolefin may be a substituted polyolefin or an unsubstituted polyolefin. For example, the polyolefin may be an unsubstituted polyolefin, which only includes a polymeric backbone formed from polymerizing monomers of the polyolefin without any additional moieties grafted thereon. For example, the polyolefin may be polypropylene. In another example, the polyolefin may be substituted polyolefin, comprising functional groups grafted to polyolefin. The functional groups may be present on the monomers of the polyolefin prior to polymerization such that the functional groups are also present on the resulting polyolefin, or grafted on the polyolefin after polymerization of the monomers of the polyolefin. For example, the polyolefin may be maleic-anhydride-grafted polypropylene.

According to various embodiments, the polyolefin may be selected from the group consisting of a polymer or a random copolymer or a block copolymer of a $C_{2-20}$alkylene, a $C_{4-20}$alkyldiene, a $C_{6-20}$alkyltriene, a $C_{3-20}$cycloalkylene, a $C_{4-20}$cycloalkyldiene, a $C_{5-20}$cycloalkyltriene, a $C_{8-20}$phenylalkylene, and a combination thereof. In various embodiments, the polyolefin may be selected from the group consisting of a polymer or a random copolymer or a block copolymer of ethylene, propylene, 1-pentene, 1-butene, 4-methyl-1-pentene, 1-hexene, 1-octene, 1-decene, styrene, ethylidene norbornene, 1,4-hexadiene, 1,5-hexadiene, 1,7-octadiene, 1,9-decadiene, dicyclopentadiene and ethylene-propylene-diene monomer. In some embodiments, the polyolefin may be polyethylene. In other embodiments, the polyolefin is polypropylene, optionally in combination with a plastomer and/or elastomer, optionally selected from an ethylene-α-olefin copolymer.

In some embodiments, the polyolefin may have a melt flow rate of about 5 g/10 min to 50 g/10 min at a temperature of 230° C. at a weight of 2.16 kg.

According to various embodiments, the polyolefin may be present in a weight percentage range of about 30 wt % to about 95 wt %, or of about 40 wt % to about 95 wt %, or of about 50 wt % to about 95 wt %, or of about 50 wt % to about 90 wt %, or of about 50 wt % to about 80 wt %, or of about 50 wt % to about 70 wt %, based on the total weight of the reinforced polyolefin composite.

In particular embodiments, the polyolefin may have a polar functional group polymer grafted thereon. The polar functional group may be selected from the group consisting of an acid anhydride, an ester, an acrylate and a combination thereof. Advantageously, due to the presence of a polar functional group grafted on the polyolefin, interaction with the combination of micro filler and the at least one nano filler may be enhanced, thereby resulting in improved strength and better dispersion of the polyolefin composite.

In some embodiments, the polar functional group may be an acid anhydride selected from the group consisting of maleic anhydride, succinic anhydride, citraconic anhydride, endo-bi-cyclo[2,2,1]-1,4,5,6,7,7-hexa-chloro-5 heptene-2,3-dicarboxylic acid anhydride, endo-bi-cyclo[2,2,1]-5-heptene-2,3-dicarboxylic acid anhydride, cis-4-cyclohexene-1,2-dicarboxylic acid anhydride, and a combination thereof. Alternatively, the polar functional group may be an ester selected from the group consisting of a maleate monoester, a maleate diester, and a combination thereof. Yet alternatively, the polar functional group may be an acrylate selected from the group consisting of methyl acrylate, methyl methacrylate, ethyl acrylate, ethyl methacrylate, butyl acrylate, butyl methacrylate, and a combination thereof.

In the event the polyolefin is unsubstituted, i.e. it does not comprise a functional group grafted on the polyolefin, it may be substantially non-polar or non-polar. As most filler materials are of a polar nature, it may be difficult to achieve good interaction between the polyolefin and the filler materials. For this reason, a modified polymer, defined herein as a polymer having a polar functional group grafted thereon, may be further added to the reinforced polymer composite. Examples of functional groups that may be grafted to the modified polymer have already been described above. Accordingly, in particular embodiments, the reinforced polymer composite further comprises a modified polymer. Advantageously, the modified polymer comprises the non-polar properties of the polyolefin, due to a substantially hydrophobic backbone, as well as polar properties due to the polar functional group being grafted thereon. Hence, it acts as a compatibilizer to enhance polar and non-polar interactions between the polyolefin and the filler material.

In some embodiments, the modified polymer having a polar functional group grafted thereon may be a modified polyolefin. The modified polyolefin may comprise a polyolefin selected from the group consisting of a polymer or a random copolymer or a block copolymer of a $C_{2-20}$alkylene, a $C_{4-20}$alkyldiene, a $C_{6-20}$alkyltriene, a $C_{3-20}$cycloalkylene, a $C_{4-20}$cycloalkyldiene, a $C_{5-20}$cycloalkyltriene, a $C_{8-20}$phenylalkylene, and a combination thereof. In various embodiments, the modified polyolefin may be selected from the group consisting of a polymer or a random copolymer or a block copolymer of ethylene, propylene, 1-pentene, 1-butene, 4-methyl-1-pentene, 1-hexene, 1-octene, 1-decene, styrene, ethylidene norbornene, 1,4-hexadiene, 1,5-hexadiene, 1,7-octadiene, 1,9-decadiene, dicyclopentadiene and ethylene-propylene-diene monomer. In one embodiment, the modified polyolefin is modified polypropylene. In one example, the modified polyolefin is maleic-anhydride-grafted polypropylene.

The modified polymer may be present in a weight percentage range of up to about 50 wt %, or between about 0.1 wt % and about 50 wt %, or between about 0.001 wt % and about 30 wt %, or between about 1 wt % and about 30 wt %, or between about 4 wt % and about 10 wt %, or between about 4 wt % and about 6 wt % based on the total weight of the reinforced polyolefin composite.

Fillers comprising a rigid micro filler and at least one nano filler are dispersed in the polyolefin. In this sense, the polyolefin may act as a polymeric matrix within which the fillers are dispersed. The term "rigid micro filler" according to the present disclosure refers to any rigid material that may be used to reinforce the polyolefin and having a maximal dimension of about 0.1 μm to about 10,000 μm. By the term "maximal dimension", it refers to a size of the rigid micro filler, as measured by its largest dimension in any direction. In embodiments wherein more than one micro fillers are present and form an agglomerate of the micro fillers in the polyolefin, wherein a maximal dimension of the agglomerate may exceed about 10,000 μm, the agglomerate of micro fillers is nevertheless considered as micro fillers since the constituents of the agglomerate are micro fillers each having a maximal dimension of about 0.1 μm to about 10,000 μm. In this sense, the term "agglomerate" refers to an assembly of the micro fillers which are reversibly attached to one another by van der Waals forces only. In various embodiments, the rigid micro filler exists in discrete form, and is dispersed in the polyolefin. In various embodiments, the rigid micro filler may have a size of about 0.1 μm to about 1000 μm, or about 0.1 μm to about 800 μm, or about 0.1 μm to about 500 μm, or about 0.1 μm to about 100 μm, or about 1 μm to about 1000 μm, or about 1 μm to about 100 μm, or about 100 μm to about 800 μm, or about 200 μm to about 700 μm, or about 300 μm, or about 650 μm. The dimensions of the rigid micro filler may depend on their processing stage. For example, before a compounding step to make the reinforced polyolefin composite, the micro filler may be such that a first dimension (for example the diameter) of the micro filler is about 50 μm to about 200 μm, or around 100 μm. A second dimension (for example the length) may be about 1000 μm to about 10,000 μm, or about 5000 μm. The rigid micro filler material may be chosen from any material, provided that it enhances strength of the reinforced polyolefin composite. It is therefore termed a rigid material. The rigidity may be expressed in terms of the Young's modulus of the rigid micro filler. For example, if a glass material is used as the rigid micro filler, the Young's modulus may be in the range of about 50 GPa to about 90 GPa, or in the range of about 70 GPa to about 90 GPa. It is clear that the material used for the rigid micro filler is relatively more rigid, i.e. has a higher Young's modulus, than the material of the at least one nano filler. Furthermore, the rigid micro filler does not chemically react with the other components of the polyolefin composite, hence does not form a covalent bond with the other components. Notwithstanding the above, it remains possible for the rigid micro filler to form other types of interaction such as ionic interaction between the rigid micro filler and the other components, for example, the modified polymer.

A material of the rigid micro filler may be selected from the group consisting of glass, carbon, cellulose, and a combination thereof.

In some embodiments, the material of the rigid micro filler may be glass. The glass micro filler may be present as glass roving, glass chopped strand, rigid, rod-like particles of glass or glass milled fiber.

According to some embodiments, the rigid micro filler may be present in a weight percentage range of up to about 60 wt %, up to about 50 wt %, up to about 40 wt %, up to about 30 wt %, up to about 20 wt %, up to about 10 wt %, or between about 1 wt % and about 60 wt %, or between about 0.1 wt % and about 40 wt %, or between about 0.1 wt % and about 30 wt %, or between about 10 wt % and about 20 wt %, based on the total weight of the reinforced polyolefin composite.

At least one nano filler is dispersed in the polyolefin. The term "nano filler" according to the present disclosure refers to any suitable material having a maximal dimension of up to about 100 nm. Accordingly, the nano filler may comprise or be formed of nanoparticles. In embodiments wherein more than one nano fillers are present and form an agglomerate of the nano fillers in the polyolefin, wherein a maximal dimension of the agglomerate may exceed 100 nm, the agglomerate of nano fillers is nevertheless considered as nano fillers since the constituents of the agglomerate are nano fillers each having a maximal dimension of about 100 nm or less. In various embodiments, the at least one nano filler are discrete nanoparticles, with each nanoparticle having a maximal dimension of up to about 100 nm. In various embodiments, the nano filler material may have a size of about 0.01 nm to about 100 nm, or of about 0.1 nm to about 100 nm, or of about 1 nm to about 100 nm, or of about 10 nm to about 100 nm, or of about 1 nm to about 90 nm, or of about 1 nm to about 80 nm, or of about 1 nm to about 70 nm, or of about 1 nm to about 60 nm, with respect to at least one dimension thereof. In certain embodiments, the particle size of the at least one nano filler is smaller than the interchain distance of the polyolefin. The interchain distance of the polyolefin refers to the average distance between two main backbones which are aligned adjacent to each other. The small size of the at least one nano filler can improve the polyolefin composite performance while reducing rigid micro filler usage in the method of production. Without wishing to be bound by theory, the mechanical properties of the reinforced polyolefin composite comprising at least one nano filler may be improved via a reinforcing effect that utilizes phenomena such as molecular surface rearrangements, particle displacements, interparticle chain breakage, and strong and weak binding. As will be made apparent from the examples, careful selection of nano filler type, size distribution, and loading can be used to specifically alter individual aspects of physical performance without changing other aspects. Thus, the customization of reinforced polyolefin composites for specific applications is possible with the benefit of the present disclosure.

The at least one nano filler may be present in a weight percentage range of up to about 90 wt %, up to about 70 wt %, up to about 50 wt %, up to about 30 wt %, up to about 20 wt %, up to about 10 wt %, or between about 0.1 wt % and about 90 wt %, or between about 1 wt % and about 60 wt %, or between about 0.1 wt % and about 40 wt %, or between about 0.1 wt % and about 30 wt %, or between about 5 wt % and about 10 wt %, based on the total weight of the reinforced polyolefin composite.

A material of the at least one nano filler may be clay. Clay may have a lower Young's modulus than the Young's modulus of the rigid micro filler. For example, the Young's modulus may be between about 0.1 MPa to about 100 MPa, depending on the type of clay that is employed. In the event the clay is modified with an organo silane, as mentioned further below, the material of the at least one nano filler may be termed as modified clay.

The clay may be surface-treated with an acrylate. The acrylate may be selected from the group consisting of 2-aminoethyl methacrylate hydrochloride, N-(3-aminopropyl)methacrylamide hydrochloride, (2-Boc-amino)ethyl methacrylate, methyl 3-(3-amino-5-methoxypyridin4-yl) acrylate, 3-(trimethoxysilyl)propyl acrylate, 2-[[(butylamino)carbonyl]oxy]ethyl acrylate, ethyl 3-(2-amino-5-bromo-3-pyridyl)acrylate, [2-(acryloyloxy)ethyl] trimethylammonium chloride or methyl 2-[(5-chloro-2-nitrophenoxy)methyl]acrylate, and a combination thereof. In one example, the acrylate is 2-aminoethyl methacrylate hydrochloride.

The clay may further comprise an organic silicate. The organic silicate may be represented by the formula Si—(OR$_3$)$_4$, wherein R is C$_{1-20}$ alkyl. In one example, the organic silicate is tetraethyl orthosilicate (TEOS).

The clay may comprise material selected from the group consisting of inorganic silicate, alumino silicate, pellet-like metal oxide and hydroxide, anionic and cationic layered metal oxide and hydroxide, montmorillonite (MMT), kaolinite, dickite, halloysite, and nacrite, nontronite, beidellite, saponite, illite, biotite, lepidolite, phlogopite, clintonite, sepiolite, zinnwaldite, phengite, mica, layered metal oxide, layered metal hydroxide, attapulgite (AT), and a combination thereof.

In some embodiments, the inorganic silicate may be calcium silicate.

The clay may comprise layered and/or pellet-like metal oxide composed of at least one oxygen atom and at least one metal. The layered and/or pellet-like metal oxide may be selected from the group consisting of SiO$_2$, TiO$_2$, ZnO, CaO, Al$_2$O$_3$, Fe$_2$O$_3$, and a combination thereof.

The rigid micro filler and the at least one nano filler may comprise or be made from the same material or from materials which are different from one another.

More than one type of nano filler, for example 2, 3, or 4 types of different nano fillers, which may differ in terms of their size or material, may be used in the reinforced polyolefin composite.

The rigid micro filler or the at least one nano filler, or both, may be further modified with an organo silane. By modifying the rigid micro filler or the at least one nano filler, a modified rigid micro filler or a modified nano filler may be obtained. Advantageously, modification of one of the fillers, or both, with an organo silane may render the surface of the filler materials more hydrophobic, thereby enhancing interaction with the polymeric matrix comprising the polyolefin and improving the affinity for the polyolefin comprised in the matrix. Alternatively or additionally, modification with an organo silane may be used as an impact modifier in order to enhance the impact resistance.

In various embodiments, the organo silane may be represented by the formula (X—R$_1$)Si—(OR$_2$)$_3$, wherein R$_1$ and R$_2$ are independently selected from C$_{1-20}$ alkyl, and X is hydrogen or —NH$_2$. Advantageously, when the at least nano filler is modified with an organo silane wherein X is —NH$_2$, this amine group may enhance the interaction between the at least one nano filler and the rigid micro filler. On the other hand, when the at least nano filler is modified with an organo silane wherein X is hydrogen, this may enhance the interaction between the at least one nano filler and the polyolefin. Therefore, modification with an organo silane provides for flexible tuning of the polarity within the polyolefin composite, thereby enabling strong dispersion.

The organo silane may a trimethoxy aminoalkyl silane. In one example, the trimethoxy aminoalkyl silane may be 3-aminopropyl-trimethoxysilane. Alternatively, the organo silane may be a triethoxy alkyl silane. In one example, the triethoxy alkyl silane may be triethoxy (octyl) silane.

In some embodiments, the organo silane may comprise an active functional group selected from the group consisting of octyl, amine, vinyl, hydroxyl, and thiol.

In some embodiments, the reinforced polyolefin composite may further comprise a stabilizer selected from the group consisting of an antioxidant, an ultraviolet ray absorber, and a combination thereof. The stabilizer may comprise a hindered phenol, a phosphite, a thioether, a benzophenone, a benzotriazole, and a combination thereof. The antioxidant may be present in a weight percentage range of about 0.01 wt % to about 1.0 wt % based on the total weight of the reinforced polyolefin composite.

The reinforced polyolefin composite may further comprise additives selected from the group consisting of a slipping agent, an antistatic agent, a pigment, and a combination thereof. The pigment may be selected from an inorganic pigment, an organic pigment or a combination thereof.

The reinforced polyolefin composite may further comprise a styrene-based polymer. The styrene-based polymer may also be termed as a minor phase polymer resin. The styrene-based polymer may be selected from the group consisting of polystyrene and styrene-acrylonitrile resin, and a combination thereof.

In a second aspect, there is provided a method of providing a reinforced polyolefin composite, comprising a polyolefin and fillers dispersed in the polyolefin, wherein the fillers comprise a rigid micro filler, and at least one nano filler, the method comprising (i) mixing a polyolefin, a rigid micro filler and at least one nano filler to form a mixture; (ii) melting the mixture to form a melted mixture; and (iii) kneading the melted mixture.

In order to obtain the at least one nano filler, the method may further comprise an initial step of preparing the at least one nano filler. The at least one nano filler may be prepared in a masterbatch process. The masterbatch process comprising the synthesis of the at least one nano filler may be carried out in a medium comprising a polyolefin, a modified polymer, a minor phase polymer resin such as a styrene-based polymer, for example, a polystyrene or in a combination thereof. In some embodiments, a master batch may comprise the at least one nano filler in the above polymer medium. In other embodiments, the nano filler may be obtained from the masterbatch process in powder form.

In some embodiments, the masterbatch process may be carried out in a molten polymer medium. In other embodiments, the masterbatch process may be carried out in a solvent-based medium.

In case the masterbatch process is carried out in the solvent-based medium, the process may comprise a first step of dispersing a precursor material, such as clay, in an aqueous solvent with acrylate. This may result in formation of positively charged ions on particles of the precursor material. The particles thus surface-treated may be dissolved in an organic solvent. The dispersion containing the surface-treated particles may subsequently be contacted with an organo silicate, as defined further above, and modified with an organo silane, as defined above, in the presence of a basic liquid catalyst to form a layer of silica on the surface-treated particles of the precursor material, thereby forming the nano filler. In the process steps above, the basic liquid catalyst may comprise ammonia, ammonium hydroxide or alkylamine. The alkylamine may include, without being limited to, methylamine and ethylamine. Advantageously, the base may serve as the catalyst for a sol-gel reaction of organo silicate and silane compounds.

Subsequent to forming the nano filler, the nano filler may be obtained in powder form from the solvent-based medium by precipitation from the medium. The precipitation may be facilitated by employing a solvent selected from the group consisting of acetone, methanol, ethanol, propanol, n-butanol, i-butanol, sec-butanol, tert-butanol, ethylene glycol, propylene glycol, butylene glycol, hexane, heptane, octane, benzene, toluene, xylene, and a combination thereof.

The mixing step i) of the method, in which a polyolefin, a rigid micro filler and at least one nano filler are mixed to form a mixture, may comprise mixing the polyolefin, the rigid micro filler and the at least one nano filler in a mixer or a drum tumbler.

The melting and kneading steps ii) and iii) mentioned above, in which the mixture of polyolefin, a rigid micro filler and at least one nano filler are melted to form a melted mixture, and kneading of the melted mixture respectively, may comprise physically agitating the mixture in a mixer, at least one roller, a twin extruder, or a combination thereof.

In a third aspect, there is provided a reinforced polyolefin composite provided by the method as described above.

In a fourth aspect, there is provided use of a reinforced polyolefin composite as described herein in transportation, infrastructure, consumer goods, and/or construction. The use in transportation may be selected from the group consisting of aerospace, automotive, train, and a combination thereof. The use in infrastructure may be selected from the group consisting of pipe, tank, and a combination thereof. The use in consumer goods may be selected from the group consisting of packaging, sporting goods, electronics, and a combination thereof.

The present disclosure relates to polyolefin composites with an improved mechanical property which minimizes the above mentioned problems. In various embodiments, a three filler system comprising a glass fiber, modified silicate nano filler and core-shell nano filler was used. It was surprisingly found that when a polyolefin is mixed with the above three fillers, the three fillers exhibited a synergistic effect in providing the composite with improved stiffness and strength. Furthermore, the composite has an improved impact resistance. In various embodiments, the composite of the present disclosure may comprise (a) a polyolefin modified optionally with low content of modified polymer, (b) modified glass fiber as disclosed and (c) masterbatch of nano fillers (i.e., modified clay, modified silicate or hybrid silicate).

The composition of this disclosure is superior in mold ability and demoldability in injection molding; and it can be also used for extrusion molding. The resulting moldings are superior in mechanical strength, weld strength, warpage, heat resistance, stiffness, and smooth appearance, as well as being chemically resistant, as is inherent in polyolefins. They are expected to find uses in many application areas, particularly automotive dash-board, machine parts, and structural members having self-tapping bosses or complicated shapes which need high weld strength.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

Hereinafter, the present disclosure will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

Experimental Section

The composite formulations comprising at least one nano fillers prepared according to the present disclosure form highly dispersed nano fillers in polymer matrices and provide good compatibility with polymer matrices. They may act as multi-function filler, thereby improving both mechanical properties and functional properties such as flame retardancy and barrier properties of composite resins. The composite formulations of this disclosure have lighter weight than existing and commercial available polypropylene (PP) compound technologies (PP/glass fiber (GF), PP/Talcom) and lighter than highest used engineering plastic in composite polyamide (PA).

Materials: The polyolefin usable in the composition of this disclosure includes the wide range of polyolefin i.e., low density polyethylene, linear low density polyethylene, medium and high density polyethylene, polypropylene, poly-1-butene, poly-4-methyl-1-pentene, ethylene-propylene block or random copolymer, ethylene-1-butene copolymer, propylene-1-butene copolymer, and mixtures thereof. These polyolefins should preferably have an MFR of 5 to 50 at 230° C., 2.16 kg.

The polar functional group grafted on polyolefin chain includes, for example, acid anhydrides and esters such as maleic anhydride, citraconic anhydride, endo-bi-cyclo[2,2,1]-1,4,5,6,7,7-hexachloro-5 heptene-2,3-dicarboxylic acid anhydride, endo-bi cyclo[2,2,1]-5-heptene-2,3-dicarboxylic acid anhydride,cis-4-cyclohexene-1,2-dicarboxylic acid anhydride, methyl acrylate, methyl methacrylate, ethyl acrylate, ethyl methacrylate, butyl acrylate, butyl methacrylate, and maleate esters (monoester and diester). Preferable among these mentioned groups are maleic anhydride. The modified polyolefins should preferably be added in an amount 0.001 to 30 wt %, preferably 4-10 wt % to the polyolefin mixture.

For rigid fiber fillers, the glass fiber used in this disclosure is glass roving, glass chopped strand, or glass milled fiber which are commonly used for reinforcement of resin. They should preferably be surface treated with, for instance, an organo silane in order to improve the affinity for the resin, and/or an impact modifier in order to enhance the impact resistance.

The metal oxide nano filler used in this disclosure includes, for example, a natural product such as montmorillonite (MMT), kaolinite, dickite, halloysite, and nacrite, nontronite, beidellite, saponite, illite, biotite, lepidolite, phlogopite, clintonite, sepiolite, zinnwaldite, phengite, mica, layered double hydroxide (LDH), or attapulgite (AT), and/or metal oxide composed of at least one oxygen atom and one other element such as $SiO_2$, $TiO_2$, ZnO, CaO, $Al_2O_3$, $Fe_2O_3$, and/or the mixture thereof.

Methodology: The composition of the disclosure can be prepared by mixing preliminarily modified polyolefin, unmodified polyolefin, glass fiber, fibrous calcium silicate, at least one nano filler and ethylene-α-olefin copolymer rubber using a Henschel mixer or drum tumbler, and then melting and kneading the mixture using a Banbury mixer, rolls, a twin extruder, or the like. However, this disclosure is not limited to these methods. The composition of this disclosure may be incorporated with stabilizers such as antioxidants and ultraviolet rays absorbers, and additives such as slipping agents, antistatic agents, and pigments. The composition of this disclosure is superior in mold ability and demoldability in injection molding; and it can be also used for extrusion molding. The resulting moldings are superior in mechanical strength, weld strength, warpage, heat resistance, stiffness, and smooth appearance, as well as chemical resistance inherent in polyolefin. They are expected to find uses in many application areas, particularly automotive dash-board, machine parts, and structural members having self-tapping bosses or complicated shape which need high weld strength.

Characterization: High Resolution Transmission Electron Microscopy (HRTEM) micrographs were taken with a Philips CM300 at 300 kV. The samples with a thickness of approximately 100 nm were microtomed at room temperature using a diamond knife and collected on 200 mesh copper grids.

Field Emission Scanning Electron Microscope (FESEM) micrographs were taken using FESEM, JEOL-6700F conducted in high resolution mode with a large objective aperture at 200 kV.

Mechanical Property: The flexural modulus was determined by 3-point bending test according to the ASTM Standard D 790-96. The injection molded sample has a specimen size of $60 \times 10 \times 1$ mm$^3$. The tests were conducted with crosshead speed of 1 mm/min, at a span length of 25.4 mm.

The injection molded sample for tensile test was carried out according to ASTM D 638-03. The Type V dimension was $63.5 \times 3.14 \times 3.2$ mm$^3$. The test was carried out using the Instron 5569 Table Universal testing machine at tensile speed of 1 mm/min.

Example 1

Polypropylene (SCG Chemicals) was mixed with maleic anhydrous grafted polypropylene (Polyone) with 5% by weight of the total mixture. In addition, The PP compound also contains (1) the long chopped glass fiber with 10%, and (2) clay master batch prepared using a method as detailed below:

Pristine clay (10 g) was mixed with deionized water (300 ml) and sonicated for 45 min then stirred vigorously for 24 h to form uniform slurry. Acetone (800 ml) was then added into the slurry slowly, precipitating a white flocculent product. After centrifuging and washing with acetone for several times, the precipitate was transferred to an acetone solution of 3-aminopropyl-trimethoxysilane (5 wt.-% of the pristine clay). The acetone/clay/silane slurry was sonicated for 30 min then stirred to facilitate the reaction between silane and clay surface to achieve silane-modified clay (SMC). The SMC solution was dispersed in epoxy resin (40 g) at room temperature using a homogenizer at 14 000 rotations per minute (rpm). After mixing for 2 h, the blends were kept in vacuum for over 48 h to remove the acetone to result in the masterbatch of 20 wt-% clay content.

The nano filler thus obtained was designated as i-Clay and added in the amount of 5 and 10% by weight of the total mixture.

Example 2

Polypropylene (SCG Chemicals) is mixed with maleic anhydrous grafted polypropylene (Polyone) with 5% by weight of the total mixture. In addition, The PP compound also contains (1) the long chopped glass fiber with 10%, and (2) clay master batch prepared a method as detailed below:

Clay (Cloisite 20 from Southern clay products) (2 g) was stirred in xylene (40 ml) by magnetic stirrer for 3 hours to intercalate the layers of clay. After that the intercalated clay/xylene suspension was sonicated for 30 minutes, highly dispersed by homogenizing process using 8 000 rpm of impeller speed for 15 minutes, and then stirred overnight at room temperature, respectively. Triethoxy (octyl) silane was selected to modify the surface of clay by homogenizing the clay/xylene suspension for 15 minutes, adding 0.2 ml triethoxy (octyl) silane into the clay/xylene suspension, heating at 80° C. for 4 hours, homogenizing 15 minutes and then stirred overnight at room temperature.

Nanoclay masterbatch (Clay-MB) was prepared by adding hot triethoxy (octyl) silane modified clay (80° C.) in hot polypropylene solution then stirring for 2 hours at 120° C. The hot polypropylene solution was prepared by dissolving polypropylene 4.0 g in xylene 40 ml at 120° C. until the polypropylene completely dissolves in xylene.

Subsequently, the suspension of Clay-MB was precipitated with ethanol and washed with ethanol for three times to remove the residual xylene. The Clay-MB precipitate was dried by oven air and grinded by pulverizer machine to produce Clay-MB powder.

The nano filler thus obtained was designated as designated as s-Clay, and added in the amount of 5 and 10% by weight of the total mixture.

Example 3

Polypropylene (SCG Chemicals) is mixed with maleic anhydrous grafted polypropylene (Polyone) with 5% by weight of the total mixture. In addition, The PP compound also contains (1) the long chopped glass fiber with 10%, and (2) silica-clay hybrid prepared using a method as detailed below:

5 g of pristine clay was dispersed in 100 mL of deionized water in the presence of 200 mg of 2-aminoethyl methacrylate hydrochloride and stirred at 80° C. for 1 hour. The gel-like suspension was centrifuged at 9000 rpm for 1 hour to separate water from modified clay which was re-dispersed in 50 mL of acetone for later use.

The modified clay dispersed in acetone was vigorously stirred at 50° C. (3-aminopropyl)-trimethoxysilane (APTMS) and tetraethyl orthosilicate (TEOS) were added into the stirred solution, followed by addition of concentrated ammonium hydroxide (NH$_4$OH). The weight ratio of clay:APTMS:TEOS:NH$_4$OH was 1:0.2:1:0.62. The weight ratio between solid clay and TEOS could be varied from 1:0.1 to 1:1. The mixture was vigorously stirred for 1 hour. Then, the solvent or medium and excess catalyst was removed under vacuum system. The wet product was further dried using rotary evaporator, and dried overnight in oven at 80° C. The resultant nano filler was kept in powder form. The nano filler products were designated as core-shell nano filler (CS).

The CS nano filler was prepared in master batch powder, and added in the amount of 5 and 10% by weight of the total mixture.

Comparative Example 1

Polypropylene (SCG Chemicals) was mixed with maleic anhydrous grafted polypropylene (Polyone) with 5% by weight of the total mixture.

Comparative Example 2

Polypropylene (SCG Chemicals) was mixed with maleic anhydrous grafted polypropylene (Polyone) with 5% by weight of the total mixture and the long chopped glass fiber with 10 to 30% by weight of the total mixture.

Figure 3:
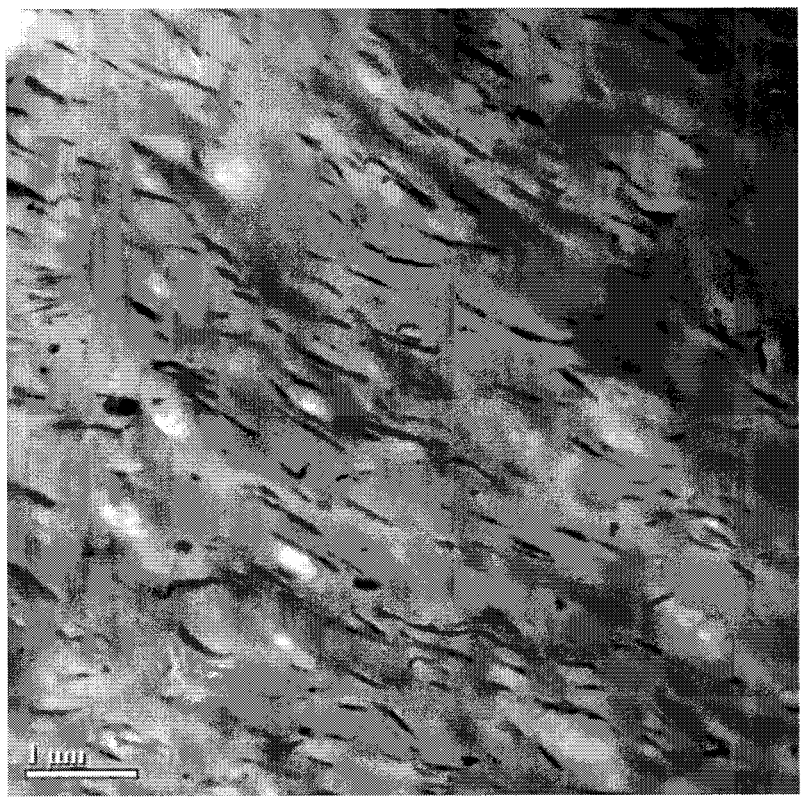
FIG. 3 is a TEM image showing the dispersion of fillers in the reinforced polyolefin composite as obtained for Example 2. The scale bar represents a length of 1 μm.
Figure 4:
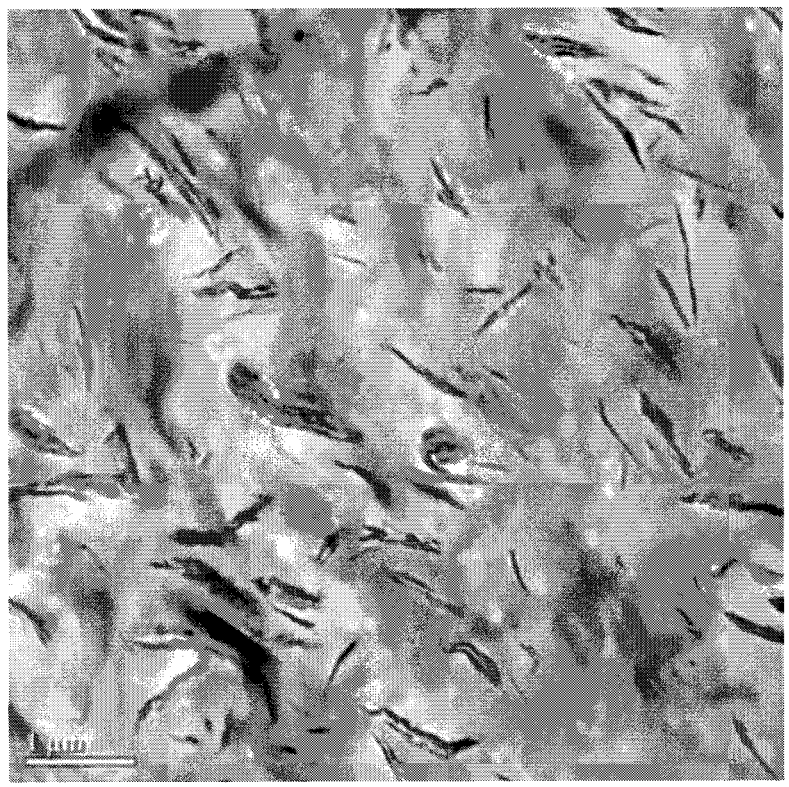
FIG. 4 is a TEM image showing the dispersion of fillers in the reinforced polyolefin composite as obtained for Example 3. The scale bar represents a length of 1 μm.

The set of results in Table 1 (FIG. 1) shows that by adding the filler system developed, the mechanical property increases remarkably. As compared to the comparative sample 2 which is the generally used system, the mechanical property of developed PP compounds (especially Example 2 and Example 3) is comparable due to the good dispersion of filler in PP matrix (as seen in FIG. 2, FIG. 3 and FIG. 4) and the strong interaction between filler and matrix. Using the developed system provides many advantages over the commonly-used system. Firstly, the developed system contains lower GF content; therefore, the weight of compound is lighter (i.e., density of PP/GF compound is around 1.2-1.4 g/cm$^3$, whereas the density of developed PP compound is 0.9-0.97 g/cm). It is also known that the GF is not relatively "friendly" for processing as the hard filler can scratch the surface of extruder screw and chamber, leading to the high maintenance cost. Using the developed filler system can help to diminish this problem.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A reinforced polyolefin composite comprising a polyolefin and fillers dispersed in the polyolefin, wherein the fillers comprise a rigid micro filler, and at least one nano filler, wherein the rigid micro filler is rigid in that it has a Young's modulus that is higher than that of the at least one nano filler, and wherein the at least one nano filler comprises positive charged clay particles having a layer of silica disposed thereon, wherein the positive charged clay particles having a layer of silica disposed thereon are obtained by surface treating clay particles with an acrylate, and treating thereafter with an organo silane and an organo silicate in the presence of a basic liquid catalyst.

2. The reinforced polyolefin composite of claim 1, wherein the polyolefin is polyethylene, polypropylene, or polypropylene in a combination with an ethylene-α-olefin copolymer.

3. The reinforced polyolefin composite of claim 1, wherein the polyolefin has a melt flow rate of about 5 g/10 min to 50 g/10 min at a temperature of 230° ° C. at a weight of 2.16 kg.

4. The reinforced polyolefin composite of claim 1, wherein the polyolefin has a polar functional group grafted thereon, or the reinforced polyolefin composite further comprises a modified polymer having a polar functional group grafted thereon, or the polyolefin has a polar functional group grafted thereon and the reinforced polyolefin composite further comprises a modified polymer having a polar functional group grafted thereon, wherein the polar functional group grafted on the polyolefin is the same as or different from the polar functional group grafted on the modified polymer.

5. The reinforced polyolefin composite of claim 4, wherein the polar functional group grafted on the polyolefin and the polar functional group grafted on the modified polymer are independently selected from the group consisting of an acid anhydride, an ester, an acrylate and a combination thereof.

6. The reinforced polyolefin composite of claim 4, wherein the polar functional group grafted on the polyolefin and the polar functional group grafted on the modified polymer are independently an ester selected from the group consisting of a maleate monoester, a maleate diester, and a combination thereof.

7. The reinforced polyolefin composite of claim 4, wherein the modified polymer is a modified polyolefin.

8. The reinforced polyolefin composite of claim 7, wherein the modified polyolefin is modified polypropylene.

9. The reinforced polyolefin composite of claim 1, wherein a material of the rigid micro filler is selected from the group consisting of glass, carbon, cellulose, and a combination thereof.

10. The reinforced polyolefin composite of claim 1, wherein the clay comprises calcium silicate.

11. The reinforced polyolefin composite of claim 1, wherein the clay comprises layered and/or pellet-like metal oxide.

12. The reinforced polyolefin composite of claim 11, wherein the layered and/or pellet-like metal oxide is selected from the group consisting of $SiO_2$, $TiO_2$, ZnO, CaO, $Al_2O_3$, $Fe_2O_3$, and a combination thereof.

13. The reinforced polyolefin composite of claim 1, further comprising a styrene-based polymer.

14. The reinforced polyolefin composite of claim 1, wherein the organo silane (a) comprises an active functional group selected from the group consisting of octyl, amine, vinyl, hydroxyl, and thiol, or (b) is trimethoxy aminoalkyl silane or triethoxy alkyl silane.

15. A method of providing a reinforced polyolefin composite, comprising a polyolefin and fillers dispersed in the polyolefin, wherein the fillers comprise a rigid micro filler, and at least one nano filler, wherein the rigid micro filler is rigid in that it has a Young's modulus that is higher than that of the at least one nano filler, and wherein the at least one nano filler comprises positive charged clay particles having a layer of silica disposed thereon, the method comprising
(i) providing at least one nano filler comprising positive charged clay particles having a layer of silica disposed thereon, wherein the providing comprises dispersing a nano filler material comprising clay particles in an aqueous solvent with acrylate to form positively charged ions on the clay particles; dispersing the positive charged clay particles in an organic solvent; and contacting the dispersion of the positive charged clay particles with an organo silicate and an organo silane in the presence of a basic liquid catalyst to form a layer of silica on the positive charged clay particles;
(ii) mixing a polyolefin, a rigid micro filler and the at least one nano filler to form a mixture;
(iii) melting the mixture to form a melted mixture; and
(iv) kneading the melted mixture.

16. The method of claim 15, wherein the organo silane (a) comprises an active functional group selected from the group consisting of octyl, amine, vinyl, hydroxyl, and thiol, or (b) is trimethoxy aminoalkyl silane or triethoxy alkyl silane.

* * * * *